United States Patent
Cazals et al.

(10) Patent No.: US 8,398,022 B2
(45) Date of Patent: Mar. 19, 2013

(54) WIDE BODY AIRCRAFT ARCHITECTURE

(75) Inventors: Olivier Cazals, Daux (FR); Thierry Druot, Saint Jean (FR)

(73) Assignee: Airbus Operations SAS, Toulouse (FR)

( * ) Notice: Subject to any disclaimer, the term of this patent is extended or adjusted under 35 U.S.C. 154(b) by 1273 days.

(21) Appl. No.: 12/108,685

(22) Filed: Apr. 24, 2008

(65) Prior Publication Data

US 2011/0220758 A1     Sep. 15, 2011

(30) Foreign Application Priority Data

Apr. 25, 2007 (FR) .................................... 07 54689

(51) Int. Cl.
  *B64C 1/00* (2006.01)
(52) U.S. Cl. .................................... 244/119; 244/137.1
(58) Field of Classification Search .................... 244/30, 244/36, 54, 55, 118.3, 119, 137.1, 25; D12/319–345
  See application file for complete search history.

(56) References Cited

U.S. PATENT DOCUMENTS

| | | | | |
|---|---|---|---|---|
| 1,855,652 | A | * | 4/1932 | Sanders ........................... 244/13 |
| D202,311 | S | * | 9/1965 | Rellis ............................. D12/337 |
| D234,079 | S | * | 1/1975 | Whitener ....................... D12/331 |
| D245,157 | S | * | 7/1977 | Seidel ............................ D12/335 |
| 4,149,688 | A | * | 4/1979 | Miller, Jr. ..................... 244/12.4 |
| 4,674,712 | A | | 6/1987 | Whitener |
| 5,088,661 | A | | 2/1992 | Whitener |
| 6,098,922 | A | * | 8/2000 | Hahl ................................ 244/36 |
| 6,102,332 | A | * | 8/2000 | Haxton et al. .............. 244/118.2 |
| D566,031 | S | * | 4/2008 | Beaunis et al. .............. D12/319 |
| 2003/0062448 | A1 | | 4/2003 | Takeshima |
| 2003/0213870 | A1 | | 11/2003 | Eakins |

FOREIGN PATENT DOCUMENTS

| | | |
|---|---|---|
| EP | 0408432 A | 1/1991 |
| EP | 1247734 A | 10/2002 |
| EP | 1332961 A | 8/2003 |
| EP | 1616786 A | 1/2006 |
| FR | 1460060 A | 6/1966 |
| FR | 2302912 A | 10/1976 |
| FR | 2879560 A | 6/2006 |
| WO | 97/43176 A | 11/1997 |

* cited by examiner

*Primary Examiner* — Tien Dinh
*Assistant Examiner* — Michael Kreiner
(74) *Attorney, Agent, or Firm* — Perman & Green, LLP (57) ABSTRACT

A large-capacity airplane principally includes a fuselage which has no region of constant width between the front and the rear and a wing fixed to the fuselage. As a preference, the engines are fixed at the rear under a horizontal tail held above the fuselage by vertical stabilizers and maintenance wells are formed in the fuselage in vertical alignment with each engine to allow the engines to be fitted and removed. The width of the fuselage is determined, on the one hand, so that the airplane landing gear is fixed to the fuselage and in the up position is included within the interior volume of the fuselage and, on the other hand, so that the rear engines are above the fuselage in order to make use of the beneficial effects of this position.

9 Claims, 9 Drawing Sheets

WIDE BODY AIRCRAFT ARCHITECTURE

BACKGROUND

1. Field

The disclosed embodiments belong to the field of airplanes comprising a wing fixed to the fuselage.

2. Brief Description of Related Developments

In particular, the disclosed embodiments relate to an airplane architecture in which the fuselage is designed to allow optimum loading of the various payloads, passengers, goods, fuel, etc.

In order to produce airplanes, particularly those with large loading capacity, without detracting from the speed performance and operational capabilities, there are various solutions that have been conceived.

A first solution is that of a conventional airplane architecture, that is to say one with a fuselage that is cylindrical over an essential part of its length and to which the airplane wing is fixed. In this case, to increase the carrying capacity of the airplane, the dimensions of the fuselage are increased either by lengthening the cylindrical part of the fuselage or by increasing the cylindrical cross section of the fuselage.

Lengthening the cylindrical part of the fuselage is generally the most suitable solution and the most widespread solution for creating a version of an existing model of airplane the capacity of which is to be increased. Examples of such airplane versions in which the capacity has been increased by lengthening the cylindrical part of the fuselage are numerous. By way of example, mention may be made of the Airbus 8321 the fuselage of which has been lengthened from the basic A320 version, or alternatively, the Boeing B737 of which the successive versions from the B737-100 to the B737-900 have had their fuselages lengthened without changing the cross section of the cylindrical part in order to increase the passenger-carrying capacity.

While a solution such as this is advantageous for increasing the capacity of an existing model of aircraft by creating a new version economically, it allows only a limited increase because of the constraints imposed by the initial design and, in particular, by the cross section of the cylindrical part of the fuselage the length of which cannot reasonably be increased beyond certain structural and operational limits.

A second known solution, also based on a conventional airplane architecture is, when designing an airplane, to define a larger cross section of the cylindrical part of the fuselage in order to increase the available volume in which a payload can be carried.

In order to avoid excessively increasing the diameters of the cylindrical sections of circular cross section in which the available volume is not easy to use optimally above certain diameters, the cross sections of the cylindrical part are either taller than they are wide, for example like on the Airbus A380 or the Boeing 737, or wider than they are tall as proposed in patent FR 1 460 060.

In these cases, the shape of the cross section of the fuselage is obtained more or less by superposing or by juxtaposing two sections close to sections corresponding substantially to parts of circles, known as lobes, determining compartmentalized regions, and the ratio between the height and the width of the fuselage is then less than 2 when the lobes are superposed or greater than 0.5 when the lobes are juxtaposed given the theoretical region of overlap of the two lobes.

Although this method makes it possible to obtain airplanes with appreciably improved carrying capacity without jeopardizing the other conventional characteristics of the airplane, it does have the disadvantage, on the one hand, of creating compartmentalized regions in the fuselage, these being dictated by the layout of the lobes, which has the effect of limiting the loading options and, on the other hand, of maintaining numerous design constraints as regards in particular the power plants, the landing gear, the loading means and other auxiliaries needed or useful in operating the airplane, these being constraints that are known on conventional airplanes in general but which are exacerbated by the dimensions of the airplanes when greater carrying capacities are being sought.

A third solution is to use the flying wing principle, that is to say the principle of an airplane with no distinct fuselage but which has a wing the central part of which is very much thicker in order to create in this central part a volume needed for carrying the payload. This type of architecture has, however, led to industrial embodiments only under exceptional circumstances.

One problem with flying wings is connected with where to install the power plants which have both not to create unacceptable aerodynamic penalties, not to limit the design of the other parts of the airplane, the fuselage, the landing gear and the exits for example, and not to present particular problems of maintenance, these being constraints that are difficult to limit when the engines are fixed under the wing or in the thickness thereof as in known embodiments.

Another problem stems from the difficulty in locating a sufficient number of exits for loading and offloading passengers or goods, because the cabin region of a flying wing is vast in terms of surface area and in terms of volume whereas the region situated around the perimeter of this cabin and in which the exits can be sited are limited and are further positioned, in part, in the leading edge of the wing in regions with great curvature and which are subjected to severe structural and aerodynamic loadings.

Another problem is concerned with the difficulty during loading and during flight of controlling the position of the center of gravity of the airplane which needs to be kept in a relatively restricted region whereas the loading area is, for its part, over a wide area.

Furthermore, this type of flying wing architecture is very far removed from the so-called conventional architectures of present day airplanes and even nowadays still comes up against prejudice which tends to reject the use of solutions which differ so much from the solutions currently in use.

It should therefore be noted that no overall airplane architecture that escapes from the constraints of conventional cylindrical-body airplanes has been proposed for producing an airplane, particularly a large capacity transport airplane, and solving the numerous problems presented by designing and operating such an airplane.

SUMMARY

The aspects of the disclosed embodiments define an airplane architecture in which the novel shape of the fuselage and the arrangement of the various parts of the airplane relative to the fuselage provides solutions to the difficulties encountered when designing large capacity airplanes.

For that, according to a conventional arrangement, the airplane comprises a fuselage and at least one wing fixed to the fuselage between a forward end and a rear end of said fuselage, the fuselage comprising a longitudinal axis directed in a direction X.

An exterior surface determines an envelope shape determining geometries of cross sections perpendicular to the longitudinal axis in successive positions offset along the longitudinal axis, each cross section having a maximum width l in a direction Y in a horizontal plane of an airplane frame of reference and a maximum height h in a direction Z in a vertical plane in the airplane frame of reference.

According to the architecture proposed by the disclosed embodiments:

the maximum width l of the cross sections of the fuselage evolves substantially continuously between the forward end and the rear end;

the maximum height h of the cross sections of the fuselage is substantially constant in a central region of the fuselage situated between a forward region at the forward end of the fuselage and a rear region situated toward the rear end of the fuselage;

for each of the forward and rear regions, the maximum height h of the cross sections evolves substantially continuously between the maximum height of the central region in a connecting section where the relevant region meets said central region and a reduced end height at the relevant end of the fuselage.

Thus, the form proposed makes it possible to obtain a large capacity fuselage which avoids the difficulties of the known solutions, particularly in terms of where to locate the exits, the engines and the landing gear.

In order to maintain a constant height over a useful cabin or cargo hold area that is as large as possible, each cross section of the central region has a height in the Z direction that is substantially constant or evolves slightly over a substantial part of the width of the relevant section in the Y direction.

For aerodynamic reasons and for better structural integrity particularly in the face of the loadings associated with the pressurizing of the cabin, the envelope shape in the central region is determined principally by four secant principal curved surfaces known as lobes, determining, at each cross section, four segments of simple curvature corresponding respectively to an upper limit, to a lower limit and to two lateral limits, one right and one left of the exterior surface of the fuselage.

For example, each curved segment is a segment of a circle or a segment of an ellipse or a segment of a curve that can be locally likened to a segment of a circle or of an ellipse.

In order for the position of the center of gravity, particularly in the direction of the X axis, which position has to be kept within certain limits, to vary less as a function of the various loading configurations, a first floor area in the fuselage corresponding to the area capable of accepting a load that is to be carried located forward of a point of reference of a mean aerodynamic chord of the wing, for example the point lying at 25% of the reference chord, is substantially equal to a second floor area in the fuselage corresponding to the floor area capable of accepting a load that is to be carried located to the rear of the point of reference of the aerodynamic chord of the wing.

In order to eliminate the effects on the drag of the airplane of the fairings commonly used for parts of the landing gear that cannot, because of their size, be housed in the natural volumes of the fuselage or of the wing, the fuselage of the airplane is designed with enough width that the landing gear can be fixed to the fuselage and that said landing gear can, in the up position, be fully housed inside the volume delimited by the envelope shape of the fuselage.

As a preference, because of the already widened shape of the fuselage, even in its rear part, a horizontal tail consists mainly of a substantially horizontal aerodynamic surface in a rear part of the fuselage and is held up above said fuselage by structural elements which advantageously consist of at least one substantially vertical aerodynamic surface which in part acts as a vertical tail.

In order to enjoy the advantages both of an engine suspended as under the wings of conventional airplanes and enjoy the masking effect of the fuselage with respect in particular to acoustic disturbances and infrared radiation from the engine, a propulsion engine or engines are held above the fuselage fixed under the horizontal tail.

In order not to penalize the maintenance operations generally associated with the lateral opening of engine cowls, the engines are spaced apart and/or spaced away from the nearby vertical structures so that any interference between the nearby structures or between cowls when the engine cowls are opened is avoided. This condition determines the width of the fuselage in the region of the rear engines so that these engines always lie above the fuselage and benefit from the desired masking effects.

In order to allow ease of maintenance operations on the engines and, in particular, the operations of fitting and removing the engines, the fuselage comprises, in vertical alignment with each engine fixed under the horizontal tail, a substantially vertical well passing through the fuselage, the dimensions of said well being large enough to fit an engine raised or lowered vertically during an operation of fitting or removing said engine.

Well hatches provide the continuity of the fuselage when closed and when in the open position uncover the upper and/or lower openings of the wells.

As a preference, to avoid any constraint associated with the hatches on the position and on the installation of the engines, each well has at least one well hatch on its upper opening which slides in a substantially longitudinal direction with respect to the fuselage between the closed position and the open position and which is advantageously, in the open position, housed inside the fuselage in an upper part of said fuselage where it is both protected and creates no obstacle to interventions on the engines.

The walls situated forward of the wells preferably correspond with the rear limit of the airplane loading region and therefore substantially coincide with the walls situated at the rear of the volumes devoted, for example, to the rear cargo holds in the fuselage capable of accepting a load and advantageously exits are formed in said walls so that loading operations can be performed from the wells.

In order to raise the elements that are to be loaded to the exits which may be at greater or lesser distances off the ground, particularly the upper exits if the airplane has, in the relevant region, two or more loading levels corresponding to superposed loading volumes, the well or wells have, in their upper parts, at least one rail for attachment to a lifting means, said rail being substantially directed along the longitudinal axis of the well, substantially in the X direction, and extending lengthwise at least partly into the well and preferably also partly into a volume of the rear cargo holds, the lifting means being capable of moving over at least part of the length of said rail so as to be able to shift the raised loads between the relevant well and the relevant cargo hold.

In one particular embodiment, in the lower part of the wells, the hatches that close off the wells are produced using one or more structures in the form of ramps articulated along a substantially horizontal line substantially perpendicular to the X direction, and in the lower part of the walls situated forward of the wells. In the raised position, the ramp or ramps close off the lower openings of the wells and in a lowered position the ramp or ramps form surfaces for access to the exits in the walls of the wells.

Advantageously, the ramp or ramps have an intermediate position in which the upper surface of a ramp is substantially in a plane determined by the X and Y directions corresponding to a loading plane of the rear cargo holds.

To increase the fuel capacity of the airplane and to increase the ability of the airplane to manage the position of the center of gravity, at least one tank capable of accepting fuel is arranged in part of the fuselage situated forward of the wing and below the loading volumes and/or in a part of the fuselage situated forward of the wing and above the loading volumes.

To improve safety, advantageously, the aircrew has a space at the front of the fuselage which is separated from the other loading volumes of the fuselage by at least one first bulkhead capable of denying individuals access to the forward space from the upper volumes of the fuselage, at least when the airplane is in flight.

To allow individuals to move around between the various spaces without compromising aircrew safety, the space at the front of the fuselage, forward of the first bulkhead and set aside for the aircrew, comprises a second bulkhead delimiting a first space, for example a crew rest area, between the second bulkhead and the first bulkhead, which is distinct from a second space situated forward of the second bulkhead, the flight deck, and in which the first and second bulkheads each have at least one exit that can be closed or opened, the exit or exits in the first bulkhead being able to be positioned in the closed or open positions independently of the exit or exits in the second bulkhead so that the first space can be used as a lock controlling access to the second space.

As a preference, at least in the interests of creating a rear mask in respect of acoustic radiation from the engines, the fuselage comprises a rear extension situated in the X direction to the rear of the wells.

Advantageously, the airplane auxiliaries such as auxiliary power units or air conditioning units are located inside the volume afforded by the rear extension and moving hatches are positioned over and below the rear extension in order to provide access to the auxiliaries.

Depending on the type of mission that the airplane is to fly, this airplane is designed with the wing fixed to the fuselage in a low position, this being the preferred configuration for aerodynamic reasons when there are no operational constraints to the contrary, or, alternatively, the wing is fixed to the fuselage in a high position, this being the configuration that is preferred for airplanes that are to operate over terrain with a lot of ground clutter that has not been well prepared, such as logistic transport, particularly military, airplanes.

Contrary to the customary design approach used to determine the characteristics of an airplane of conventional architecture, in order to obtain the maximum of advantages afforded by the architecture proposed on the basis of a wide body, the positions of the wheels which are determined by operational criteria and the positions of the engines which are held up above the fuselage in the rear part of said fuselage are defined during the design stage before the dimensions of the fuselage are determined and, in a later step, the width of the fuselage:

is determined, in the cross sections the planes of which intersect the elements of the landing gear, so that the bulky parts of the landing gear are, in the gear up position, fully included in the volume delimited by the envelope shape of the fuselage;

is determined, in the cross sections the planes of which intersect the engine elements, in such a way that all the parts of an engine lie completely above or completely to one side, in the direction of the Z axis, of the fuselage.

A detailed description of some exemplary embodiments is given with reference to the figures which diagrammatically depict:

BRIEF DESCRIPTION OF THE DRAWINGS

FIG. 2a: a front-on view of the airplane of FIG. 1a;

FIG. 2b: a side view of the airplane of FIG. 1a;

FIG. 2c: a plan view of the airplane of FIG. 1a;

FIG. 2d: an illustration of the envelope shape of the fuselage at section AA;

FIGS. 3a and 3b: perspective views from above (FIG. 3a) and from below (FIG. 3b) in cutaway schematically illustrating interior parts of the airplane of FIG. 1a;

DETAILED DESCRIPTION OF THE DRAWINGS

Figure 1A:
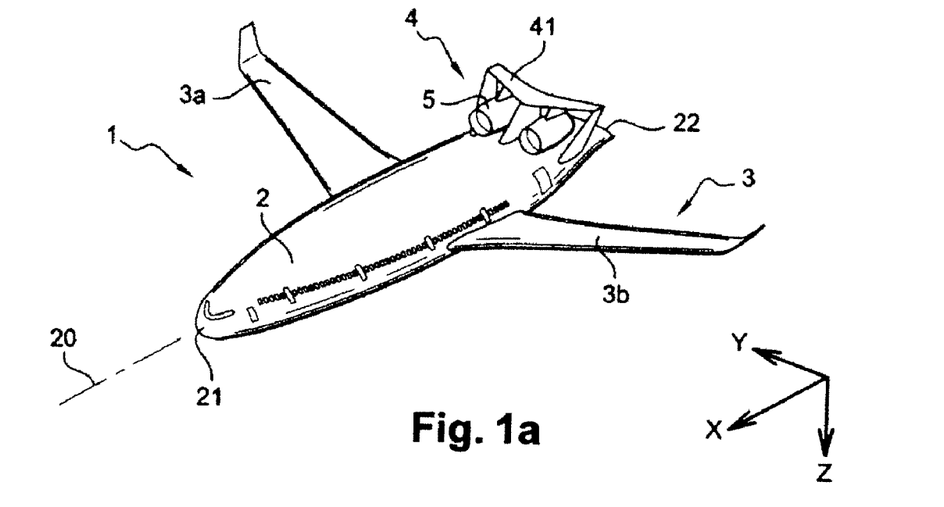
FIGS. 1a and 1b: perspective overviews of an airplane according to the disclosed embodiments comprising a low level wing (FIG. 1a) and an airplane according to the disclosed embodiments comprising a high level wing (FIG. 1b)
Figure 1B:
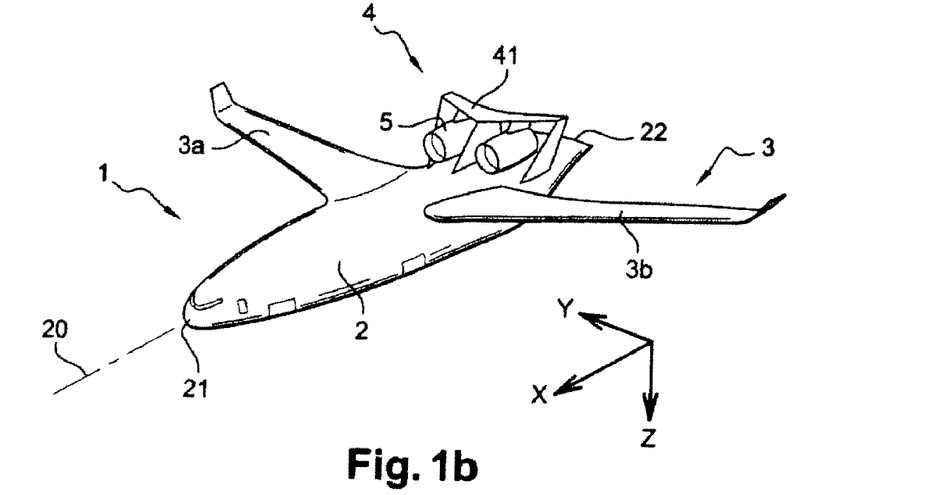

As illustrated in FIGS. 1a and 1b, an airplane 1 comprises a fuselage 2, comprises a wing 3 fixed to the fuselage 2 in the region of said fuselage somewhere between a front end 21 and a rear end 22 of said fuselage, said wing itself consisting of two half-wings 3a and 3b spanning out on each side of the fuselage with respect to a longitudinal axis 20 of the fuselage and comprises a tail 4 fixed in the rear part of the airplane 1 above the fuselage 2, said tail itself comprising a substantially horizontal surface 41 known as the horizontal tail, under which one or more airplane propulsion engines 5 are fixed.

For the purposes of describing one embodiment, reference is made to three principal axes of a conventional airplane frame of reference:

an X axis parallel to the longitudinal axis 20 of the fuselage and directed positively toward the front of the airplane;

a Z axis perpendicular to the X axis parallel to a vertical plane of symmetry of the airplane, directed positively downward;

a Y axis perpendicular to the plane determined by the X and Z directions, directed positively to the right of the airplane.

The wing 3 therefore extends with its span essentially in the Y direction.

In a first exemplary embodiment depicted in FIG. 1a, the wing 3 is connected to the fuselage 2 and in a lower part of said fuselage, the airplane configuration being known as a low wing configuration.

In a second exemplary embodiment shown in FIG. 1b, the wing 3 is fixed to the fuselage 2 in an upper part of said fuselage, the airplane configuration being known as the high wing configuration. As will be described later on, this high wing configuration, although slightly less favorable in terms of aerodynamic integration, has advantages for specific applications such as when the airplane is being used for logistic transport.

Figure 2A:
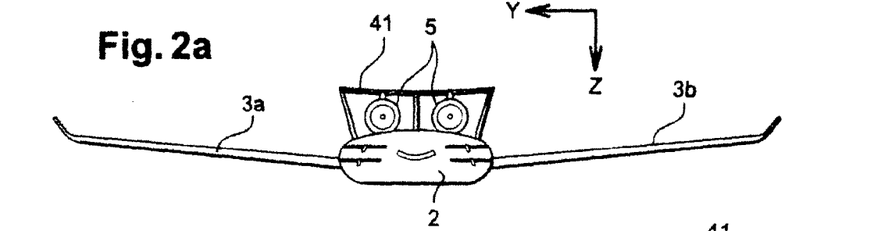
Figure 2B:
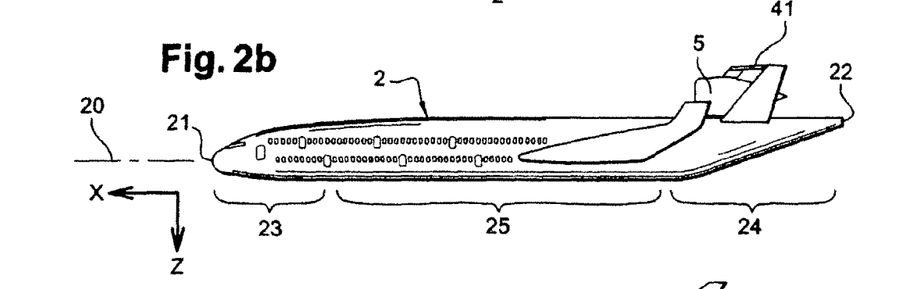
Figures 2C, 2D:
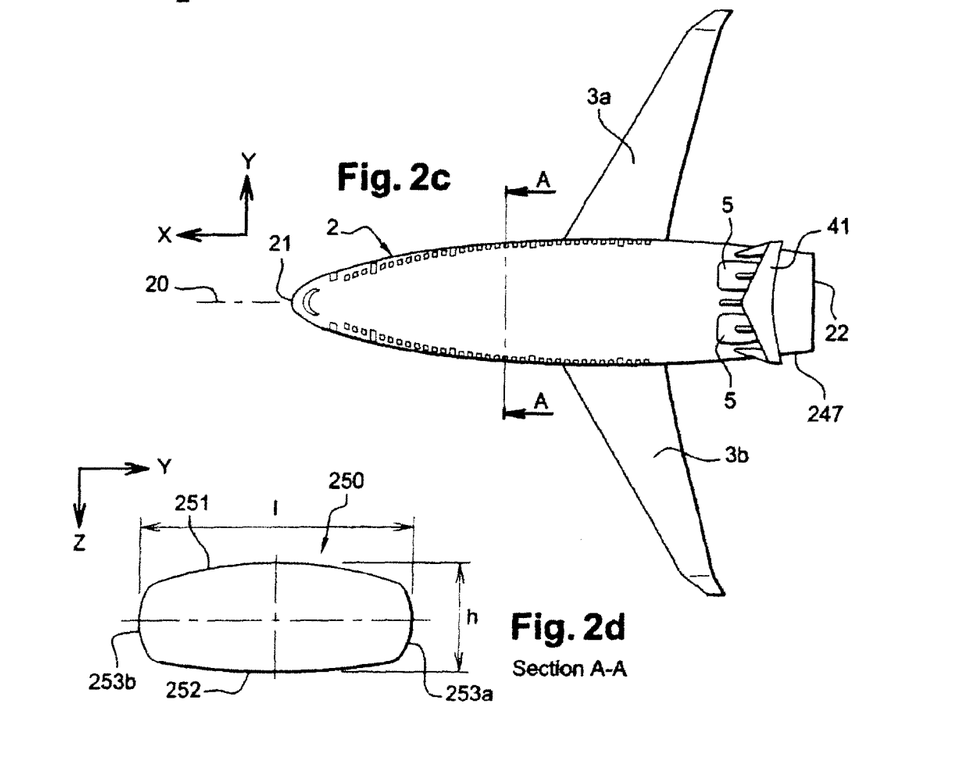

According to the disclosed embodiments, the exterior geometry of the fuselage 2, that is to say a shape defined by an exterior surface of the fuselage, the surface in contact with the aerodynamic flow, has the following characteristics which are demonstrated in particular in FIGS. 2a, 2b and 2c:

the envelope shape of the fuselage 2 has cross sections, in planes perpendicular to the direction of the X axis, of a width l greater on average than the height h of said sections, as illustrated by the section shown, for example, in FIG. 2d;

the shape of the fuselage 2 in plan view, that is to say the shape in a view projected onto a plane XY as seen in FIG. 2c, continuously evolves between the front end 21 and the rear end 22, that is to say that the width l of the fuselage in this projected view is not constant except over a marginal length relative to the total length of the fuselage;

the maximum height h of the fuselage 2, that is to say the dimension of the envelope shape in the Z direction in a vertical plane of symmetry XZ passing through the axis 20 of the fuselage, is substantially constant over part of the length of the fuselage 2, known as the central region 25 of the fuselage, between a forward region of evolving thickness 23 and a rear region of evolving thickness 24.

In a preferred embodiment, in a region of greater width of the fuselage 2, which corresponds substantially to the central region 25 of substantially constant maximum height, the ratio of the width l of the cross sections of the fuselage to the height h of said sections is greater than 2 and preferably less than 3.5.

Furthermore, the cross sections perpendicular to the axis X of the fuselage 2, particularly in the central region 25 of the fuselage, have very approximately rectangular shapes, that is to say that the heights of the sections of the fuselage are substantially constant or evolve little over a substantial part of the width of the relevant section, as can be seen in FIG. 2d for a general section, so as to keep the useful height inside the fuselage 2 as constant as possible and obtain the greatest useable interior fuselage space.

In one exemplary embodiment, the envelope of the fuselage 2, at least in the central region 25, is formed by four main lobes corresponding, at cross sections of the fuselage, to an upper edge 251, to a lower edge 252 and to two lateral edges 253a, 253b of the section. Each edge corresponds to a simple arc of a curve, for example an arc of a circle or an arc of an ellipse, of one of the four lobes which, in particular, have large radii of curvature in the case of the upper and lower lobes, giving the fuselage 2 the flattened appearance characteristic of the airplanes shown in the various figures. The lobes corresponding to the lateral edges, although they do not need to have such large radii of curvature because of the proportionately shorter height of the fuselage, nonetheless have radii of curvature that are advantageously substantially greater than half the height of the fuselage near the point where the lateral lobes meet the lower and upper lobes in order to limit the interior regions of the fuselage that are affected by the reduction in cabin height near the lateral walls. Advantageously, the various lobes meet one another via intermediate shapes that produce fillets of smaller radii in order to avoid sharp angular connections and improve the aerodynamic flow in these regions.

Figure 3A:
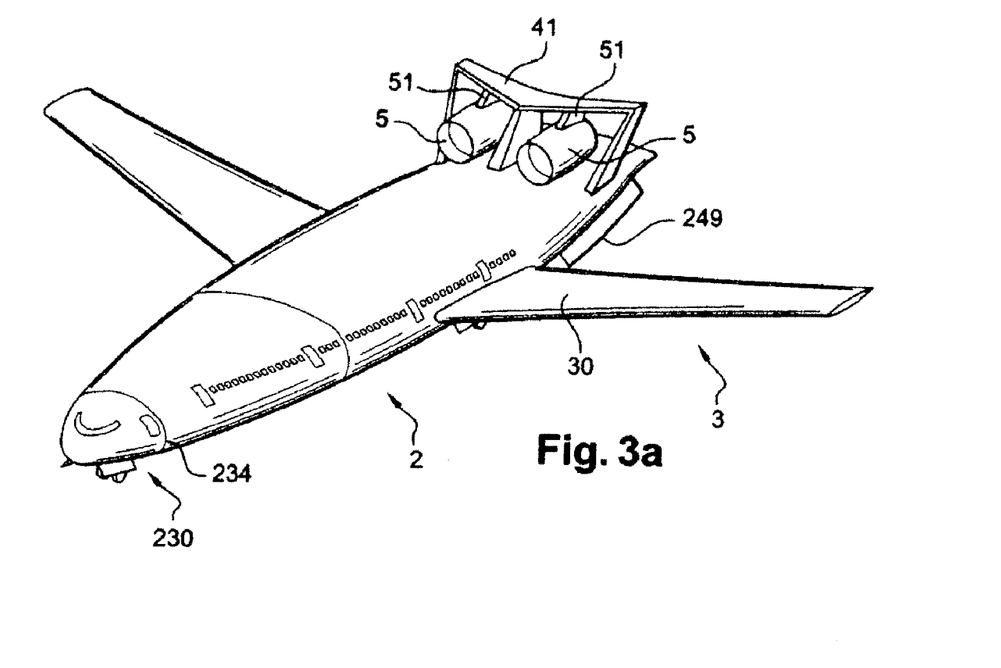

In the forward 23 and rear 24 evolving regions, in which regions the aerodynamic flow is disturbed the most because of the presence of the fuselage 2 and in which the fuselage interior volume criteria are less critical, the cross sections of the fuselage are no longer dictated by the same interior volume requirements and said cross sections advantageously evolve toward sections 239, 249 of substantially elliptical shapes in the direction away from the central region 25 as illustrated in FIG. 3a.

In airplanes, the position of the center of gravity has to be perfectly controlled for reasons essentially of flyability, which have impacts on performance and safety. The centering, the longitudinal position of the center of gravity in the X direction, is determined with respect to a reference aerodynamic chord 31a or 31b of one of the half-wings 3a or 3b, which in theory are symmetric. The flight manual of all airplanes defines a forward limit for the position of the center of gravity 32 and a rear limit, these limits corresponding to precise positions in the X direction in the frame of reference of the airplane and are often expressed as percentages of the mean aerodynamic chord length 31a, 31b, measured from the leading edge of said mean aerodynamic chord.

In order to limit the movement of the longitudinal position of the center of gravity 32 as a function of the various airplane loading scenarios, the relative position, along the longitudinal axis X, of the wing 3 and of the fuselage 2 is determined such that areas 61, 62 capable of accepting variable loads, passengers or goods, are balanced between the forward and rear of a reference point of the mean aerodynamic chord 31a, 31b.

However, the relative position of the wing 3 and of the fuselage 2 along the X axis is also dictated by other aerodynamic considerations, considerations involving the incorporation of the power plant and of structures and in order to meet the criterion of distribution of surface areas 61 and 62 without giving rise to unacceptable penalties in respect of other considerations, the loading area situated forward of the wing 5 in the central region 25 and in the evolving front region 23 is tailored during airplane design by choosing a fuselage shape in plane view, in the XY plane, that tapers somewhat toward the front, that is to say is somewhat rounded and or somewhat elongate in the X direction. Thus, in order to reduce the forward surface area 61, the evolving shape of the fuselage forward of the wing is more tapered and in order to increase this surface area, this shape is more rounded.

It should be noted that this method of controlling the loading surface areas at the design stage does not apply to a conventional airplane architecture in which the fuselage is cylindrical over practically its entire length or to the case of an airplane architecture of the flying wing type.

Figure 3B:
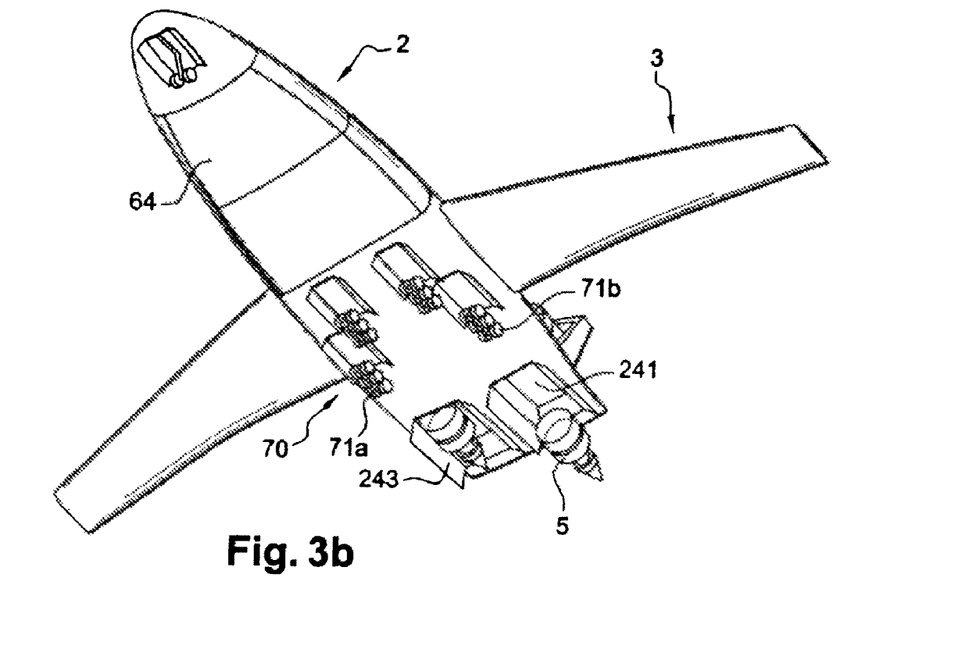
Figure 5:
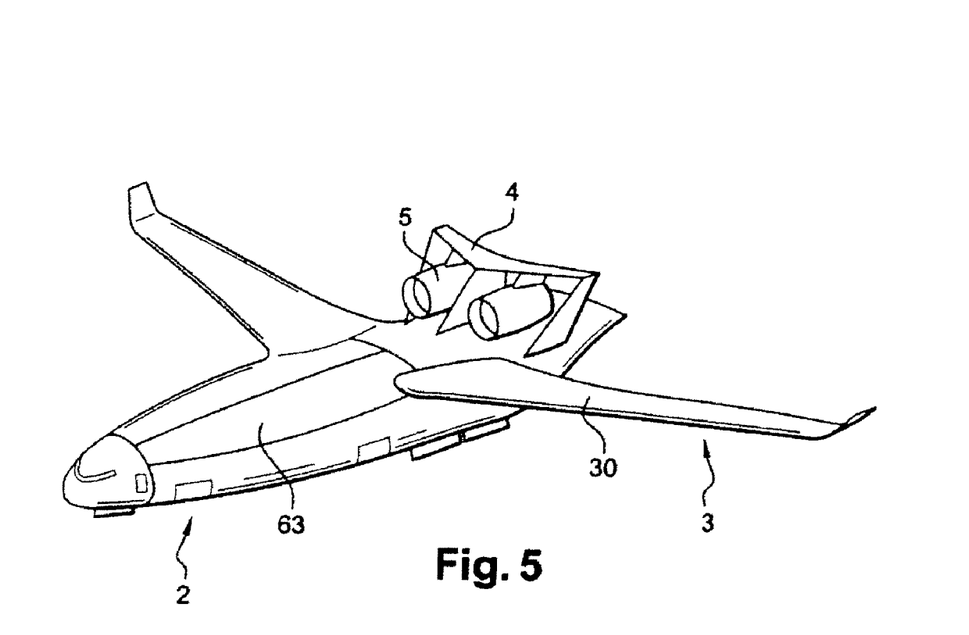
FIG. 5: a perspective cutaway view schematically illustrating the interior parts of the airplane of FIG. 1b.
Figure 6:
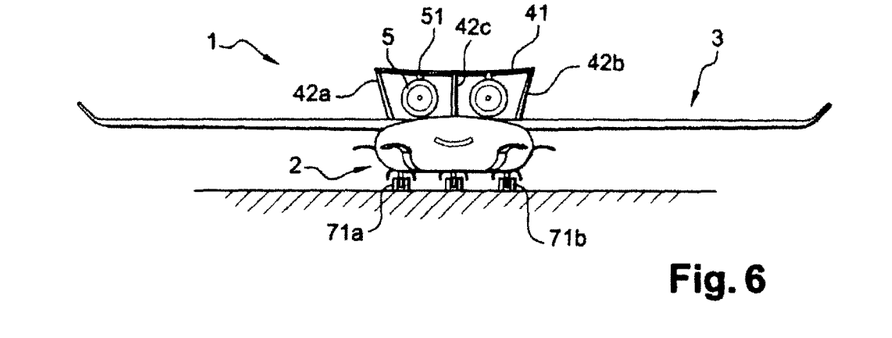
FIG. 6: a front-on view of the airplane of FIG. 1b, resting on the ground.

In order to gain best control over the position of the center of gravity 32, particularly when the airplane is in flight, the proposed airplane architecture makes it possible not only to position fuel tanks 30 in the wing 3, in a way that is conventional with structural tanks, but also in the fuselage 2 in an upper part 63 of the fuselage 2 as illustrated in FIG. 5 or in a lower part 64 of the fuselage as illustrated in FIG. 3b. The fuel in the fuselage, preferably distributed over several tanks, makes it possible to modify the position of the center of gravity because of the offset position of the tanks with respect to the position of the center of gravity of the airplane.

The volume of the fuselage tanks that can be achieved in the fuselage is great because of the large surface area of the fuselage in the XY plane and the thicknesses available between the interior walls of the cabin and the walls of the fuselage, which available thicknesses, in terms of absolute values, are of the same order of magnitude as the thickness of the wing.

The fuselage tanks 63, 64 are used, on the one hand, to increase the fuel capacity of the airplane if the distance to be covered requires additional amounts of fuel to be carried or if the airplane needs to be used as a refueling airplane, particularly for performing in-flight refueling of other airplanes, but they are also used to control the position of the center of gravity as a function of the fuel consumption used taken from each tank and, if necessary, by transferring fuel between tanks situated at different positions along the X axis.

In a high capacity airplane which is therefore, of necessity, heavy, it is beneficial to have a landing gear comprising a great many wheels to spread the weight of the airplane on the surface of the landing strips used and present day airplanes using a wing fixed in the lower part of the fuselage and, even more so those that use a wing fixed in the upper part of the fuselage, have to have large-sized fairings to enclose the landing gear during cruising flight. Fairings such as this are doubly penalizing because, on the one hand, of their weight associated with their size and because of the impact they have on the aerodynamic performance of the airplanes.

According to the airplane architecture proposed, the width of the fuselage 2 is determined, amongst other things, by the possibility of positioning the landing gear 70, particularly the main elements of the gear which in general carry over 80% of the weight of the airplane on the ground, on the fuselage 2 so that in the up position said landing gear is fully housed in the natural shapes of the fuselage 2 and requires no aerodynamic fairing.

Figure 3C:
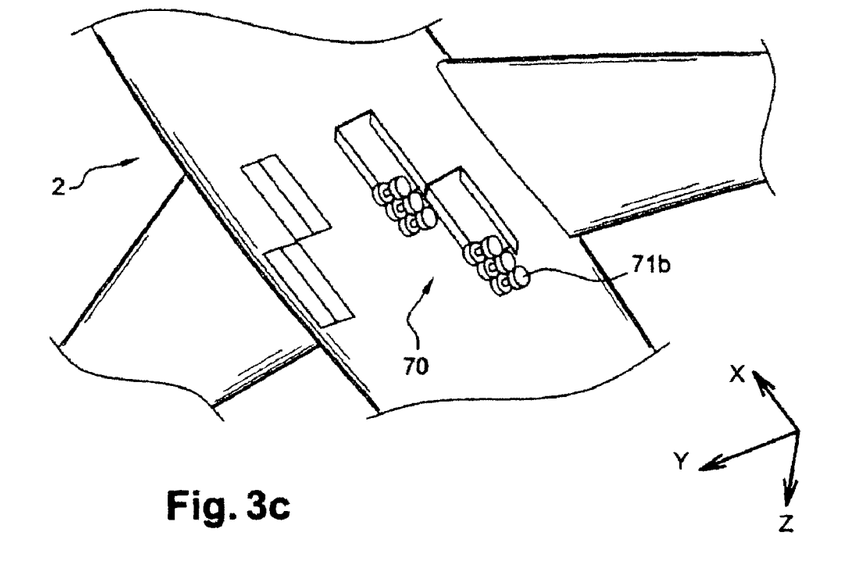
FIGS. 3c and 3d: partial views of the fuselage showing elements of the main landing gear in the down position on one side of the fuselage and, on the other side, the fuselage when the landing gear is in the up position.
Figure 3D:
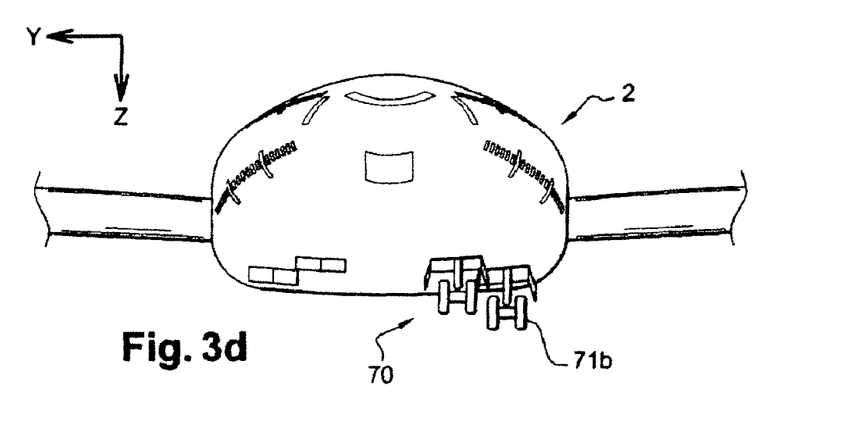
Figure 4:
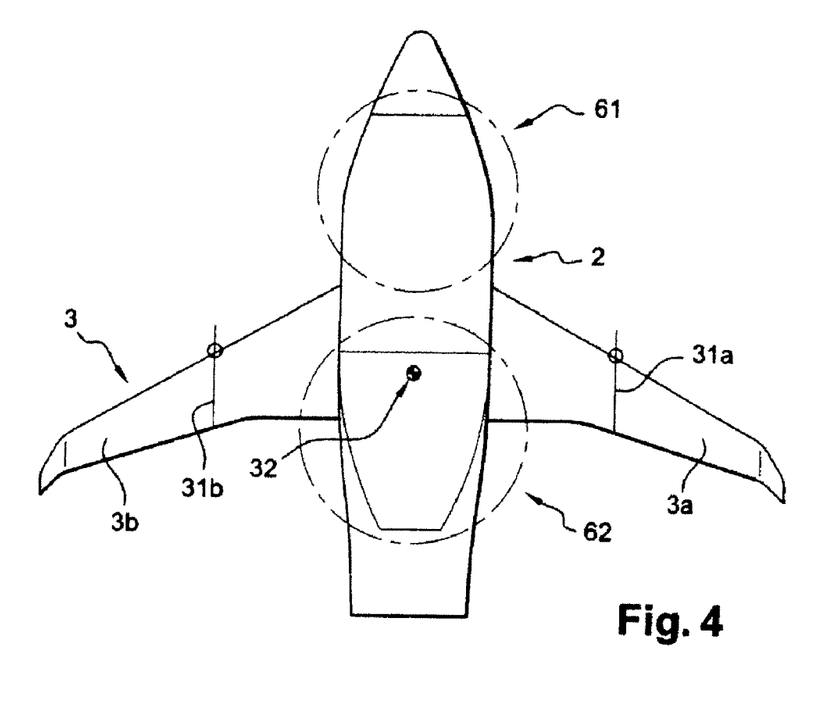
FIG. 4: a schematic illustration of how the loading regions are distributed.

Advantageously, as illustrated in FIGS. 3b, 3c and 3d, this condition is satisfied with longitudinal movements along the X axis of the moving parts of the landing gear 70 in order to raise and lower said landing gear thus making it possible to produce simpler and more lightweight structures than can be produced when the moving elements are used to deploy the landing gear laterally in the Y direction, both in the case of the landing gear itself and in the case of the moving hatches which provide the continuity of the fuselage when the landing gear is up.

Thus, unlike a conventional design of airplane, in which the fuselage is determined according to a criterion essentially associated with the payload and in which the main elements of the landing gear are positioned in order to obtain the track width needed for the operational performance of the airplane and are housed in the fuselage subsequently making use as necessary of complex kinematic linkages and of fairings protruding from the natural surface of the fuselage, in the airplane 2 according to the disclosed embodiments, the overall width determined by the main elements 71a, 71b of the landing gear is determined first of all to suit the track width needed for the airplane as a prerequisite and then, in a later stage, the width of the fuselage at said landing gear elements is determined so that said elements can be fully raised up into the fuselage as illustrated in FIGS. 3c and 3d which show, on one side of the fuselage, the landing gear in the down position and, on the other side of the fuselage, the landing gear in the up position.

Figure 7:
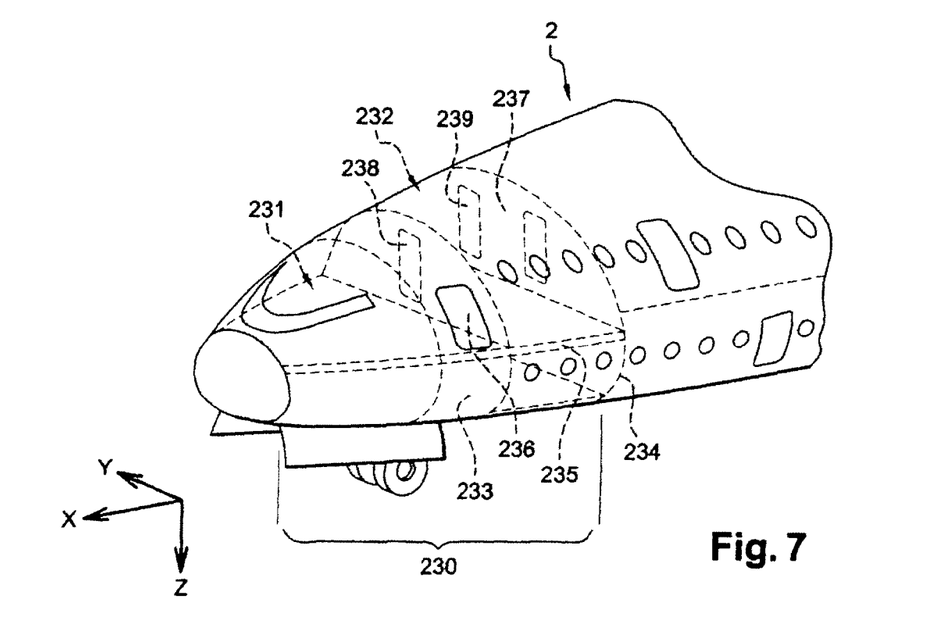
FIG. 7: a partial perspective cutaway view of the front part of a fuselage.

Another specific feature of the airplane 2 that can be seen in FIG. 3a and in FIG. 7, which are views with partial cutaway, concerns the arrangement of the very front part 230 of the fuselage 2 situated forward of a position in the X direction substantially determined by a fuselage frame 234 delineating a region of the fuselage cabin devoted to the flight crew.

In this very front part 230 which corresponds to the detail in cutaway shown in FIG. 7, the interior volumes of the fuselage, because of the evolving shape of the front part 23 as described earlier, do not allow an optimal layout in terms of commercial payload, passengers or goods, which means that its use can be reserved for the flight crew without penalty.

The very front part 230 is preferably divided into two regions, a first region 231 corresponding to the conventional flight deck of airplanes and, behind a bulkhead 233 delimiting the rear part of the flight deck, a region 232 which extends between the bulkhead 233 of the flight deck and a bulkhead 237 at the frame 234, this region 232 advantageously being used as a rest area for the aircrew.

In a preferred embodiment, the region 231 of the flight deck or the rest area 232 has an exit 236 to the outside and the bulkhead 237 at the frame 234 is a closed bulkhead which completely isolates, at least in terms of the movement of individuals, the space accessible to the passengers from the space reserved for the aircrew and thus avoids any risk of malevolent action on the flight deck.

In another similar embodiment, the region 231 of the flight deck and the rest area 232 are separated by a reinforced bulkhead 233 and communicate via a door 238 that is also reinforced. Furthermore, a door 239 in the bulkhead 237 places the rest area 232 in communication with the space accessible to the passengers so that the rest area 232 between the bulkheads 237 and 233 that delimit said rest area, which have doors 239 and 238 respectively, is used as a lock between the passenger region behind the bulkhead 237 and the flight deck forward of the bulkhead 233 that makes it possible, by barring or allowing the opening of the doors 239 and 238 in said bulkheads 237 and 233, to control access of individuals to the flight deck 231 and advantageously from said flight deck.

In a preferred embodiment, the space reserved for the pilots, the flight deck 231, and the rest area 232 which are delimited at the rear by the bulkhead 237 involves only the part situated above a floor 235 of the flight deck and the region situated under the floor 235, which in terms of layout, has the same disadvantages as the region located above, is set out to act as a rest area for the flight attendants in the passenger cabin.

Another particular feature of the architecture proposed by the disclosed embodiments concerns the layout of the tails 4 situated at the rear of the airplane 1 and of the engines 5.

Figure 8:
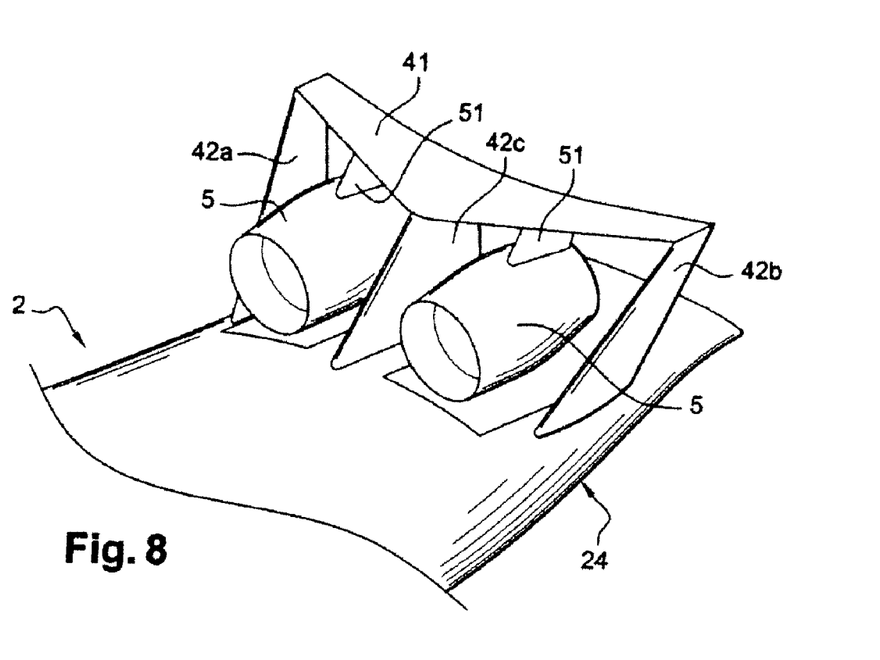
FIG. 8: a partial perspective view of the rear part of a fuselage illustrating a rear engines arrangement.

According to this particular feature that can be seen in the various figures and particularly in the detail of FIG. 8, a horizontal tail 41 is held up above the fuselage 2 in the rear region 24 by means of one or more vertical structures 42a, 42b, 42c preferably, at least in the case of one of them, acting as the vertical tail of the airplane 1. The horizontal tail 41 and the structures 42a, 42b and 42c when used as a vertical tail are advantageously equipped with conventional trailing edge control surfaces for the purposes of controlling the airplane during flight.

Fixed under the horizontal tail 41 are the engines 5 used to propel the airplane 1. The engines 5 are fixed in a region situated above the fuselage 2, by means of support structures 41, for example engine pylons.

This arrangement of the engines 5 has the advantages of limiting the propagation of noise generated by the engines toward the ground and therefore the exposure of populations living near airports to noise problems. The noise radiated downward by the air intakes, particularly the turbojet fan noise, is effectively masked by the fuselage 2 in front of the engines 5, particularly as a result of the width of the fuselage. The noise radiated downward by the jets leaving the engines 5 is masked by a rear extension 247 of the rear region 24 of the fuselage which extends substantially to the rear of a vertical outlet plane of the engines. This rear extension 247 of the fuselage is even more advantageous from an acoustic standpoint when certain noise radiated upward by the engines is reflected toward the ground by the horizontal tail 41 but is reflected back up again by said rear extension.

Similarly, the vertical structures 42a, 42b situated on the outer sides of the engines 5 and the shapes of which, for aerodynamic reasons, correspond to surfaces substantially parallel to the airflow in flight, limit the sideways radiation of noise emitted by the jet engines and therefore the ground noise emissions on the sides of the airplane.

Furthermore, the intermediate vertical structure 42c holds the horizontal tail 41 with greater rigidity and, if necessary, acts as a screen protecting an engine from a potential explosion of an adjacent engine.

In any event, the vertical structures are arranged, particularly in terms of distance in the Y direction, with spacings such that moving parts of the engines, particularly the cowlings that can be opened for the purpose of performing engine maintenance, can be actuated with no mechanical interference.

Another advantage of the layout of the engines that has just been described relates to the possibility of detecting the airplane 1 the acoustic signature and infrared signature of which become appreciably smaller in the face of threats such as terrorist threats in particular.

Another advantage of the engine layout just described concerns protecting the air intakes of the engines from ingesting, on the ground, foreign bodies which may be sucked in as is the case of engines fixed under the wings. This arrangement is therefore particularly advantageous when this risk is high such as, for example, when the airplane is used on improvised landing strips, particularly in military use.

Thus, as has been described, and in a similar way to that which was described in respect of the landing gear in the relevant region of the fuselage, the width of the fuselage 2 in the rear region 24 is constrained by the power plant. In this rear region 24, the width has to be at least sufficient for the engines 5 to be situated above the fuselage 2 and for the lateral support structures 42a and 42b, if used, to be able to be fixed to the fuselage 2.

In a modified embodiment (not depicted), the horizontal tail 41 comprises lateral extensions which extend the span of said tail so that when projected onto a horizontal plane XY, said extensions extend in the Y directions beyond the limits of the fuselage.

Such lateral extensions make it possible to increase the surface area of the horizontal tail 41 or to increase its geometric elongation if needed.

Furthermore, these lateral extensions are used if necessary to hold engines, known as side engines, in the same way as the engines 5 can be, above the fuselage so as to enjoy increased thrust when the thrust obtained by the engines situated above the fuselage is insufficient, particularly on account of there being an insufficient number of engines given the possible thrust and/or possible dimensions of such engines.

Although the lateral engines arranged in this way on the extensions do not derive full benefit of all the advantages afforded the other engines on account of their being positioned above the fuselage, the overall assessment of the airplane is still favorable particularly on account of the lower individual thrust per engine when more engines are used to propel one and the same airplane.

For ease of maintenance of the engines 5, particularly for relatively simple operations of fitting and removing engines in a similar way to the operations performed when the engines are fixed to the wing of an airplane, the fuselage 2 comprises, in vertical alignment with the engines 5 in the Z direction, wells 241 known as maintenance wells via which the engines 5 can be raised or lowered, as illustrated in FIG. 3b, by lifting means (not depicted) fixed to the structure of the horizontal tail 41 or to the support structures 51 of the engines 5 such as the engine pylons.

Outside of maintenance operations being performed on the engines 5, the upper and lower openings of the wells are closed off by upper 241 and lower 243 hatches which ensure the continuity of the exterior surface of the fuselage, particularly for aerodynamic reasons.

In one particular embodiment, the upper hatches 242 are articulated, for example in similar ways to landing gear doors. In this case, the dimensions and the articulation devices of said hatches are determined in such a way as to avoid interference with the engines 5 when said engines are in position, fixed under the horizontal tail 41.

Figure 9:
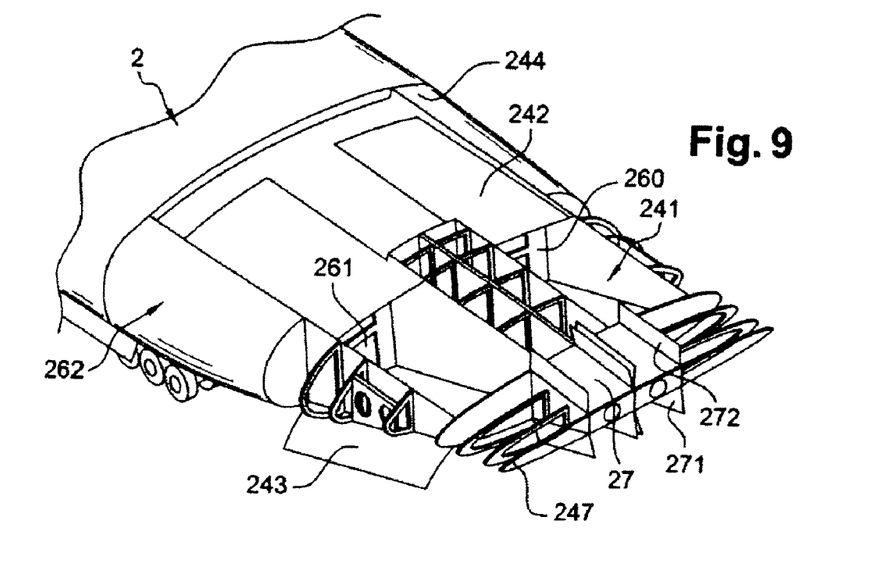
FIG. 9: a perspective and partial cutaway detail view of a rear region of the fuselage of the airplane of FIG. 1a, with the engines and tails not depicted.

In another preferred embodiment, the hatches 242, as illustrated in FIG. 9, are sliding. Said hatches slide, for example, on guide rails not depicted, forward and are preferably guided under the exterior structure of the fuselage in a false ceiling 244 visible in FIG. 9 in which the exterior structure of the fuselage is not depicted.

According to this embodiment, the hatches 242 are better protected from the risks of damage during the operations of fitting or removing engines and the presence of the false ceiling 244 is advantageously used to enhance the acoustic insulation of the cabin with respect to the noise generated by the engines 5, and in particular with respect to noise radiated by the air intakes of said engines.

A sliding arrangement such as this for the hatches 242 allows the engines 5 to be positioned closer, or at least without additional constraint, to the upper wall of the fuselage 2 without there being any need to employ complicated and cumbersome kinematic linkages needed for articulated hatches that need to avoid interfering with the engines.

When lateral engines are mounted on extensions of the horizontal tail 41, the locations of said engines in the Y direction are preferably chosen so that each of said engines can be raised and lowered vertically from its point of attachment to the horizontal tail 4 without any risk of interference between said engine and the fuselage which in this case requires no special adaptation in consideration of the operations of fitting and removing said engine.

The rear extension 247 of the rear region 24 is advantageously used for installing airplane auxiliaries, for example auxiliary power units 27 or alternatively, air conditioning units.

Through this arrangement, the auxiliary power units 27, which generally use turbines which always present problems in terms of acoustic insulation, are particularly well separated from the sensitive regions of the airplane, for example the spaces reserved for passengers, because of the presence of the wells 241 and possibly cargo holds 262 between said units and said sensitive areas.

In addition, upper 272 and/or lower 271 hatches provide simple and practical access to said units, this access being rendered possible when, in their retreated position, they lie in a region of the fuselage of reduced thickness with no obstacle from above or below.

To improve the loading capabilities, particularly the ability to load goods or bulky equipment, the wells 241 designed to allow the maintenance operations associated with the engines 5, have exits 261 in a front wall 260 of the wells 241, which wall 260 is also a rear wall for a region corresponding to a volume 262 used as a cargo hold for the airplane 1.

These exits 261 are made with dimensions suited to the payloads that are to be carried in the hold, particularly standardized containers 28.

Figure 10:
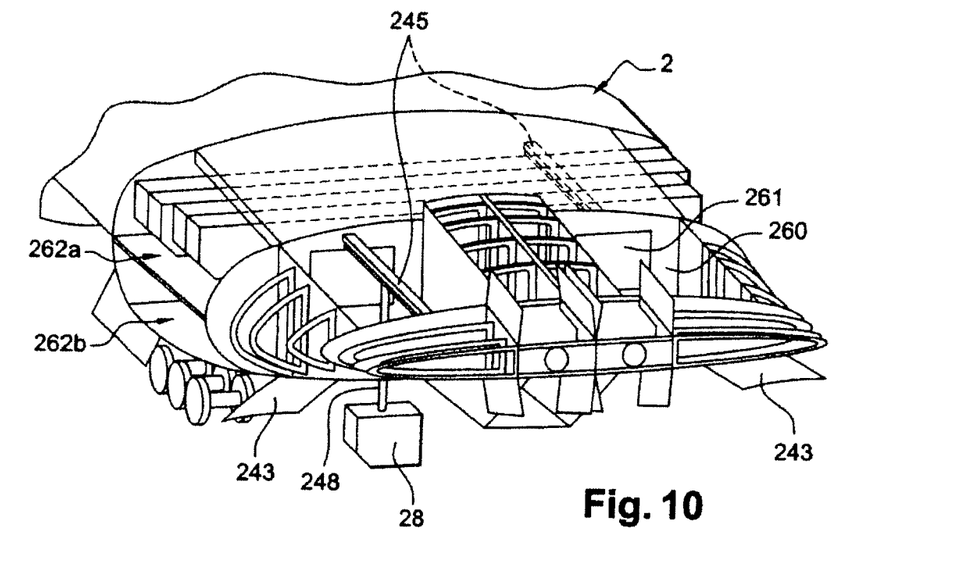
FIG. 10: a perspective and partial cutaway detail of a rear region of the fuselage of the airplane of FIG. 1a illustrating a loading principle, with the engines and tails not depicted.

In a first exemplary embodiment illustrated in FIGS. 9 and 10, the exits 261 are arranged at different loading levels, there being two of these in the figures corresponding to an upper cargo hold 262a and a lower cargo hold 262b.

Advantageously, in each well 241, an upper rail 245 to which lifting means 248 are fixed is positioned substantially along the longitudinal axis of the exits 261 at the upper part of the well. As a preference, said rail extends at its front end into the upper cargo hold 262a so that loads fixed to the lifting means 248 can be moved along the rail 242 between the well 241 and the upper cargo hold 262a.

The upper rail 245 can be removed to clear the passage through the well when an engine 5 is to be lowered or raised via said well or, in another embodiment, the upper rail 245 can move in a direction corresponding to its longitudinal axis so that it can be stored at least temporarily in a part of the ceiling of the upper cargo hold 262a.

In one exemplary embodiment, the upper rail 245 is secured to the upper hatch 242, said hatch in theory being opened only for operations on the engines which also entail removing the rail.

When the airplane comprises, in the rear region 24 of the fuselage, two superposed cargo holds each having an exit, a second rail, not depicted, is, if needed, arranged like the upper rail 245 in the ceiling of the lower cargo hold 262b and said second rail is capable of moving to free the passage through the well 241 when loads are to be raised up into the upper hold 262a.

In an alternative form of embodiment, with the lower cargo hold 262b relatively close to the ground, other autonomous loading means are technically and economically advantageous, such as loading ramps or lifting platforms (not depicted) for example, these making it possible to dispense with the use of a beam and of a dedicated winch for the lower cargo hold 262b.

In this first example of an architecture of the rear region of the fuselage and of the loading exits, the lower hatches 243 are advantageously articulated hatches opening laterally, as visible in the examples of airplanes depicted in FIGS. 3b and 9, to facilitate access to the region situated in vertical alignment with the wells 241 for ground based means of handling and loading the containers and other goods that are to be loaded into or unloaded from the cargo holds 262, 262a, 262b of the airplane 1.

Figure 11:
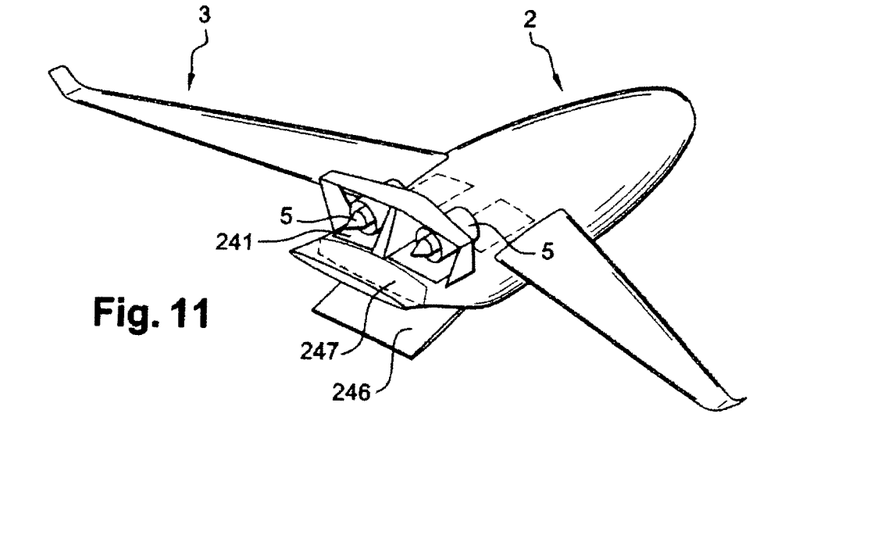
FIG. 11: a perspective view of the airplane of FIG. 1b comprising a loading ramp in the lowered position.
Figure 12:
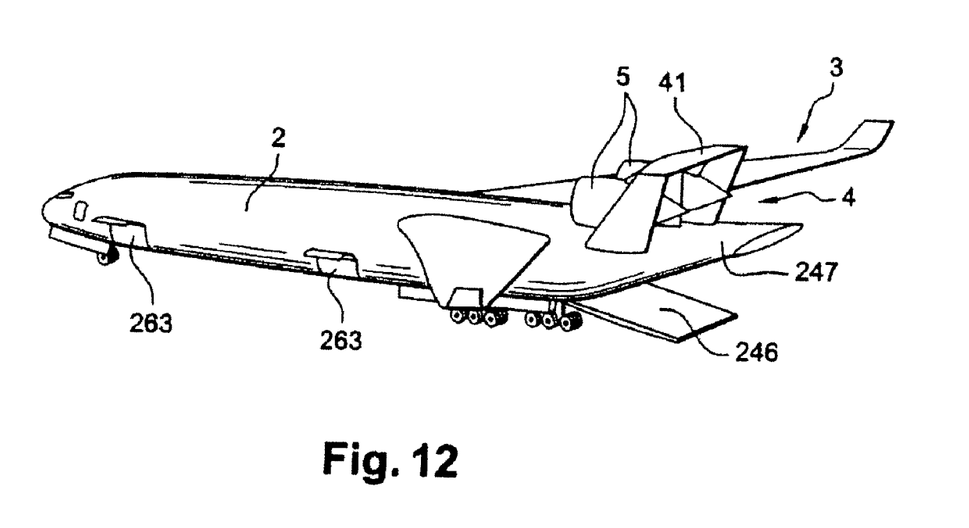
FIG. 12: a perspective overview of a twin engine cargo airplane with high level wing in the loading/unloading configuration.

In a second exemplary embodiment illustrated in FIGS. 11 and 12, the lower openings of the wells 241 are closed by a door 246 wide enough to cover said two openings or by independent doors of smaller dimensions, one for each well (this solution has not been depicted). The door 246 or the doors are articulated near the lower region of the fuselage 2 on that edge of the door that is situated toward the front of the airplane 1, that is to say also along that side of the wall 260 of the well 241 that has an exit 261. In the raised position, the door or doors provide the aerodynamic continuity of the fuselage and, in the lowered position as illustrated in FIG. 11 or FIG. 12, they can be used as loading ramps for loading the cargo holds, at least in the case of the cargo holds that have an exit into a well 241 the floor of which is close to the forward point of articulation of the door 246.

It is apparent from the description that the proposed architecture for a large capacity transport airplane displays numerous advantages that the more conventional airplane architectures with a fuselage comprising a cylindrical part or the more innovative architectures such as flying wings are not capable of affording except in small measure at the expense of disadvantages that are often operationally unacceptable.

The invention claimed is:

1. An airplane comprising a fuselage and at least one wing fixed to the fuselage between a forward end of said fuselage and a rear end of said fuselage, the fuselage comprising a longitudinal axis directed in a direction X and an exterior surface determining an envelope shape determining geometries of cross sections perpendicular to the longitudinal axis in successive positions offset along the longitudinal axis, each cross section having a maximum width l in a direction Y in a horizontal plane of an aircraft reference system and a maximum height h in a direction Z in a vertical plane in the airplane reference system, wherein:

the fuselage comprises a central region of the fuselage situated between a forward region comprising a flight deck at the forward end of the fuselage and a rear region situated toward the rear end of the fuselage, wherein the rear region comprises a tail;

the maximum width l of the cross sections of the fuselage evolves substantially continuously between the forward end and the rear end;

the maximum height h of the fuselage along the X direction is substantially constant in the central region;

each cross section of the fuselage in the central region has approximately a rectangular shape with the maximum width l larger than the maximum height h to give a flattened appearance to said fuselage;

the maximum height h of the cross sections of the forward region evolves in the X direction substantially continuously between the maximum height of the central region in a connecting section where the forward region meets said central region and a reduced end height at the forward end of the fuselage; and the maximum height h of the cross sections of the rear region evolves in the X direction substantially continuously between the maximum height of the central region in a connecting section where the rear region meets said central region and a reduced end height at the rear end of the fuselage.

2. An airplane according to claim 1, in which the envelope shape in the central region is determined principally by four secant main curved surfaces, determining, at each cross section, four curved segments corresponding respectively to an upper limit, to a lower limit and to two lateral limits, one right and one left of the exterior surface of the fuselage, each of the four curved segments corresponding to an arc of circle or an arc of ellipse, wherein at least the curved segments corresponding to the upper limit and to the lower limit have a radii of curvature providing the cross section with an approximately rectangular shape and the fuselage with a flattened appearance.

3. An airplane according to claim 1, in which a floor area inside the fuselage and dedicated to payloads has a first floor area located forward of a point of reference of a mean aerodynamic chord of the wing and a second floor area located to the rear of the point of reference of the aerodynamic chord of the wing, said second floor area being substantially equal to the first floor area.

4. An airplane according to claim 1, comprising landing gear fixed to the fuselage and having at least two stable positions, one position comprising an up position, said landing gear being, in said up position, completely housed inside the volume delimited by the envelope shape of the fuselage.

5. An airplane according to claim 1, wherein the tail comprises a horizontal tail, the airplane comprising a substantially horizontal aerodynamic surface held above the fuselage by at least one substantially vertical aerodynamic surface.

6. An airplane according to claim 5, comprising at least one propulsion engine held above the fuselage and fixed under the horizontal tail.

7. An airplane according to claim 6 wherein a rear end fuselage width is at least sufficient to accommodate engines above the fuselage and wherein said fuselage comprises, under each engine fixed under the horizontal tail, a substantially vertical well passing through the fuselage and in vertical alignment with said each engine, the dimensions of each said well being large enough to fit an engine during an operation of fitting or removing said engine.

8. An airplane according to claim 7 in which a wall situated forward of each well corresponds with a rear wall of a rear cargo compartment inside the fuselage and in which said rear wall has at least one exit of the rear cargo bay opening inside the well.

9. An airplane according to claim 8, in which at least one ramp, articulated along a substantially horizontal line substantially perpendicular to the X direction and in the lower part of each wall situated forward of each well, has a raised position in which said ramp closes a lower opening of one or more wells, has at least one lowered position in which said ramp forms a surface for accessing the at least one exit in the rear wall of the rear cargo compartment and has an intermediate position in which an upper surface of the ramp is substantially in an horizontal plane of the aircraft reference system and corresponding to a plane for loading the rear cargo holds.

* * * * *